Jan. 25, 1966    L. L. DRAGOO ETAL    3,231,001
TIRE CHANGING MACHINE

Filed April 15, 1964    3 Sheets-Sheet 1

Leland L. Dragoo
Paul W. Goebel
INVENTORS

BY Clarence A. O'Brien
and Harvey B. Jacobson
Attorneys

Jan. 25, 1966   L. L. DRAGOO ETAL   3,231,001
TIRE CHANGING MACHINE
Filed April 15, 1964   3 Sheets-Sheet 2

Leland L. Dragoo
Paul W. Goebel
INVENTORS

Jan. 25, 1966 L. L. DRAGOO ETAL 3,231,001
TIRE CHANGING MACHINE
Filed April 15, 1964 3 Sheets-Sheet 3

Leland L. Dragoo
Paul W. Goebel
INVENTORS

BY Clarence A. O'Brien
and Harvey B. Jacobson
Attorneys

United States Patent Office 3,231,001
Patented Jan. 25, 1966

3,231,001
TIRE CHANGING MACHINE
Leland L. Dragoo, 1800 Market St., Beatrice, Nebr., and
Paul W. Goebel, R.F.D. 2, Fairbury, Nebr.
Filed Apr. 15, 1964, Ser. No. 360,035
9 Claims. (Cl. 157—1.17)

This invention relates to a novel and useful tire changing machine and more specifically to a machine designed to assist in the removal of a tire casing from and its mounting on a wheel rim of the type including a removable lock ring.

This invention constitutes an improvement over my copending U.S. application, Serial No. 193,930 entitled Tire Changing Machine, now Patent No. 3,156,289, issued November 10, 1964.

Many heavy duty truck tire casings have relatively high side wall ply ratings and these heavy duty tires are difficult to handle and are customarily mounted on wheel rims of the type including one integral tire seating flange and a removable tire seating flange which may be in the form of a split lock ring.

A tire casing may be readily axially advanced toward a wheel rim of the type including a removable retaining flange for the purpose of mounting the tire casing on the wheel rim. In addition, when the removable retaining flange has been removed, it is relatively easy to axially slide the tire casing from engagement with the wheel rim. However, it is oftentimes extremely difficult to remove the split retaining flange due to the normal tendency of a tire casing to expand, it being necessary to inwardly deflect the adjacent side wall of a tire casing in order that the removable split flange may also be initially shifted axially inwardly of the associated rim before it may be spread and removed from engagement with the rim prior to removal of the tire casing from the rim. In addition, it is also difficult to inwardly deflect a tire casing mounted on the aforementioned type of wheel rim so that the split locking ring may be placed about the associated rim inwardly of its usual lock position prior to the split flange being seated in locking engagement with the wheel rim.

It is accordingly the main object of this invention to provide a tire changing machine constructed in a manner whereby the machine will be capable of inwardly deflecting a tire casing in order that the locking flange of the associated wheel rim may be readily removed from engagement with the rim or applied to the rim in locking engagement therewith.

Another object of this invention, in accordance with the preceding object, is to provide a tire changing machine including a base from which upstanding support means projects adapted to support a wheel rim in an elevated horizontally disposed position above the base with means being provided in the form of a pressure head mounted from the base above the support means for guided movement toward and away from the support means and including depending leg means whose lower ends are adapted to engage and downwardly depress the upper side wall of a tire casing supported from the upstanding support means. As soon as the leg members have been utilized to downwardly depress the upper side wall of the tire casing, the split locking ring of the associated wheel rim may be readily removed from or applied to the rim in locked engagement therewith.

Another object of this invention is to provide a tire changing machine in accordance with the preceding objects including means mounting the upstanding support means from the base for horizontal movement relative to the base between positions disposed beneath the pressure head and disposed to one side of the latter.

Still another object of this invention is to provide means in the form of depending arms carried by the pressure head and engageable with a wheel rim for lifting the latter relative to the upstanding support means and to also provide depending leg or arm members supported from the base and above the upstanding support means engageable with a depressed casing side wall for retaining the side wall in a depressed condition while the pressure head of the machine is raised relative to the base after the lifting arms carried by the pressure head have been engaged with the rim on which the tire casing whose side wall is depressed is mounted.

Yet another object of this invention is to provide a tire changing machine constructed in a manner so as to readily conform to wheel rims and tires of varying sizes.

A final object of this invention to be specifically enumerated herein is to provide a tire changing machine which will conform to conventional forms of manufacture, be of simple construction and easy to use so as to provide a device that will be economically feasible, long-lasting and relatively troublefree in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 5 is a fragmentary vertical sectional view taken substantially upon the plane indicated by the section line 5—5 of FIGURE 3;

FIGURE 6 is a perspective view of a portion of one of the slide members by which the pressure leg members of the tire changing machine are adjustably mounted on the vertically positionable pressure head;

FIGURE 7 is a perspective view of one of the leg members of the tire changing machine; and FIGURE 8 is a horizontal sectional view on somewhat of a reduced scale and taken upon a plane passing through the upstanding support means.

Figure 1:
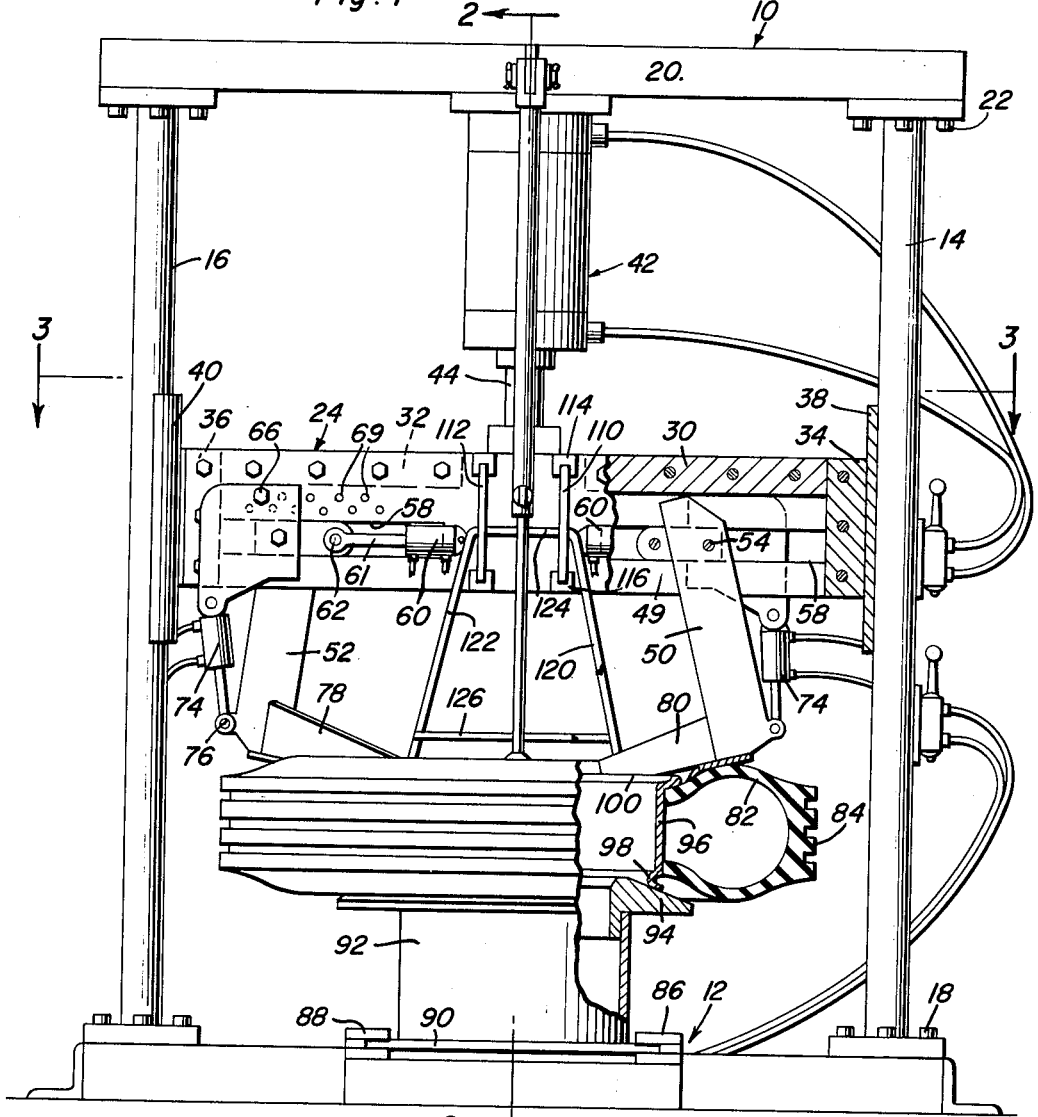
FIGURE 1 is a side elevational view of the tire changing machine of the instant invention shown with a wheel rim and tire casing mounted thereon, portions of the tire changing machine, wheel rim and tire casing being broken away and shown in vertical section so as to clearly illustrate the structural details thereof.
Figure 2:
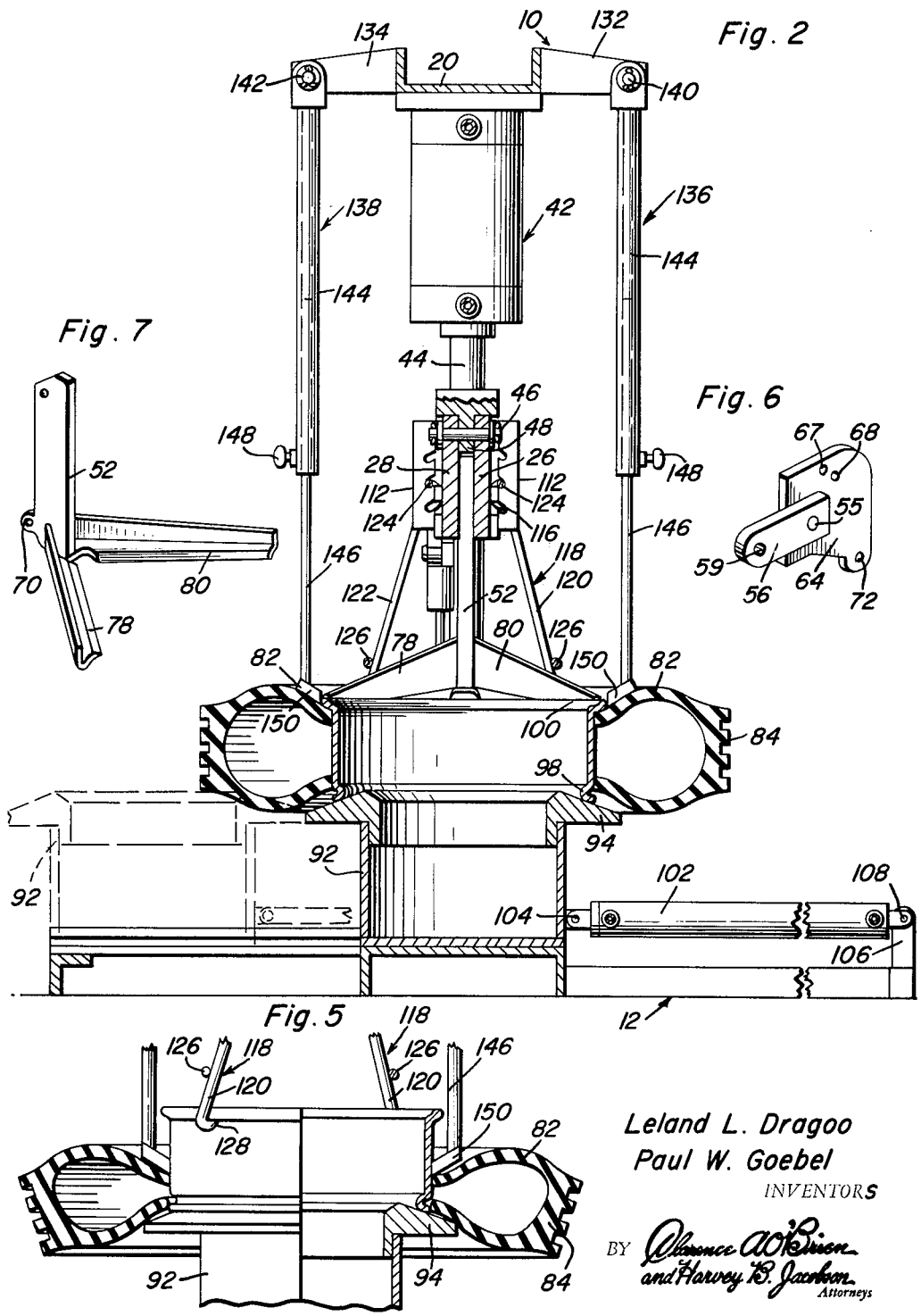
FIGURE 2 is a vertical transverse sectional view taken substantially upon the plane indicated by the section line 2—2 of FIGURE 1 and showing an alternate position of the upstanding support means in phantom lines.
Figure 3:
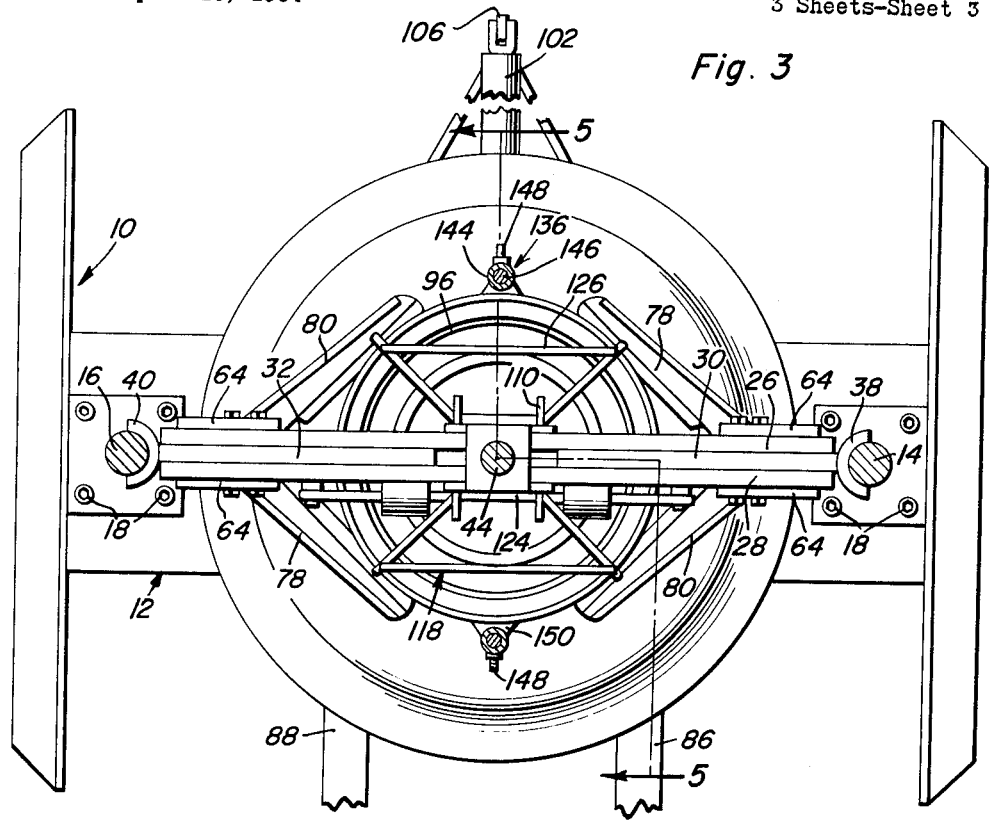
FIGURE 3 is a fragmentary horizontal sectional view taken substantially upon the plane indicated by the section line 3—3 of FIGURE 1.

Referring now more specifically to the drawings the numeral 10 generally designates the tire changing machine of the instant invention and it may be seen from FIGURES 1–3 and 8 of the drawings that the machine 10 includes a base generally referred to by the reference numeral 12. A pair of upright guide standards 14 and 16 are secured at the lower ends to the base 12 by means of fasteners 18 and have a crossbeam 20 secured between their upper ends by means of fasteners 22. A pressure head assembly generally referred to by the reference numeral 24 extends between the uprights or standards 14 and 16 and comprises a pair of side plates 26 and 28 interconnected by means of a pair of filler plates 30 and 32 at their upper ends and at their opposite ends by means of a pair of filler plates 34 and 36.

A pair of generally semicylindrical guides 38 and 40 are secured to the opposite ends of the pressure head assembly 24 and slidably embracingly engage the confronting portions of the standards 14 and 16 respectively thereby mounting the pressure head assembly 24 for vertical movement toward and away from the base 12. An extensible fluid motor generally referred to by the reference numeral 42 has its upper end secured to the crossbeam 20 in any convenient manner and the lower end of its piston rod 44 is secured to the pressure head 24 in any convenient manner such as by a pivot pin 46 secured through the side plates 26 and 28 and an apertured depending portion 48 carried by the lower end of the piston rod 44 and received between the side plates 26 and 28 between the adjacent ends of the filler plates 30 and 32.

The confronting surfaces of the side plates 26 and 28 dsiposed between filler plates 30 and 32 and between filler plates 34 and 36 define a downwardly opening pocket 49 in which the upper ends of a pair of depending pressure leg members 50 and 52 are pivotally secured by means of pivot pins 54 which each are also rotatably received in a pair of bores 55 formed in a pair of slide bars 56 which are slidingly received in a pair of guide slots 58 formed in the opposite ends of each of the side plates 26 and 28. Each of the slide blocks 56 also has a bore 59 formed therethrough and each end of the pressure head assembly 24 is provided with a hydraulic cylinder or fluid motor 60 which has the extended end of its piston 61 secured between the ends of each pair of corresponding guide bores 56 remote from the bores 55 by means of a pivot pin 62 passed through the extended end of the corresponding piston rod 61 and received in the corresponding bores 59.

The pivot pins 55 are also secured through a pair of guide plates 64 which support each pair of corresponding slide blocks 56 and embracingly engage the corresponding end of the presure head assembly 24, each pair of guide plates 64 being secured in adjusted positions longitudinally of the pressure head assembly 24 by means of a fastener 66 secured through one of the pair of apertures 67 and 68 formed in each pair of guide plates 64 and a selected one of the bores 69 formed through the side plates 26 and 28. It is, of course, to be noted that the fluid motors 60 may be connected to a suitable source of hydraulic fluid under pressure for actuation thereby. Further, it may be seen that each of the leg members 50 and 52 includes an apertured ear portion 70 and that each pair of guide plates 64 includes a pair of corresponding apertured ear portions 72. An extensible fluid motor 74 is pivotally secured between the apertured ear portions 72 and the free end of its piston rod secured to the corresponding apertured ear portion 70 by means of a pivot pin 76.

The fluid motor 42 as well as the fluid motors 74 may also be operatively communicated with the aforementioned suitable source of fluid under pressure (not shown) for actuation of the hydraulic motors 42 and 74.

A pair of inwardly diverging arms 78 and 80 are carried by the lower end of each of the leg members 50 and 52 and define a foot portion adapted to engage and to depress the upper side wall 82 of the tire casing 84.

The base 12 includes a pair of generally parallel guides 86 and 88 defining a pair of confronting channels in which the outwardly projecting flanged portion 90 of an upstanding and generally cylindrical support member 92 is slidably received. The upstanding support member 92 is open at its upper end and an adapter ring 94 is seated in the upper end of the support member 92.

The tire casing 84 is mounted on a wheel rim 96 of the type including an integral groove 98 for releasable interlocking engagement with a split bead-retaining flange and an integral bead retaining flange 100. The upstanding support member 92 is slidable longitudinally of the guides 86 and 88 and has one end of an extensible fluid motor 102 pivotally secured thereto as at 104 while the other end of the fluid motor 102 is pivotally secured to an upstanding pivot member 106 supported from the base 12. The extensible fluid motor 102 is pivotally secured to the member 106 by means of a pivot pin 108 and it is to be noted that the fluid motor 102 is also to be operatively communicated with the aforementioned source of fluid under pressure in order that the fluid motor 102 may be actuated to shift the upstanding support member 92 between the first position illustrated in solid lines in FIGURE 2 of the drawings and the second position illustrated in phantom lines in FIGURE 2 of the drawings.

With attention now directed to FIGURES 1–4 of the drawings it may be seen that each of the side plates 26 and 28 has a pair of vertical plates 112 secured thereto by means of upper and lower mounting plates 114 and 116. The edges of the plates 110 and 112 adjacent the side plates 26 and 28 have inwardly and upwardly opening notches 116 formed therein and each pair of vertical plates 110 and 112 pivotally supports the upper end of a lifting arm generally referred to by the reference numeral 118 and including a pair of downwardly divergent side members 120 and 122 interconnected at their upper ends by means of a bight portion 124. The bight portions 124 are rotatably received in corresponding pairs of the notches 116 formed in the associated pair of vertical plates 110 and 112. The lower ends of each pair of side members 120 and 122 are interconnected by means of a cross brace 126 and the lower end of each side member 120 and 122 is hooked inwardly as at 128 for releasable engagement with the corresponding portion of the integral flange 100 for lifting the rim 96 as the pressure head assembly 24 is raised by means of the fluid motor 42.

In addition, it may be seen that the crossbeam 20 includes a pair of opposite side laterally outwardly projecting support arms 132 and 134 which have the bifurcated upper ends of a pair of leg element assemblies 136 and 138 pivotally secured thereto by means of pivot pins 140 and 142, respectively. The leg element assemblies 136 and 138 each include an upper tubular section 144 and a lower rod section 146 which has its upper end telescopingly received within the lower end of the corresponding upper section. Each of the upper sections includes a setscrew 148 for retaining the lower section 146 in adjusted extended positions and the lower terminal ends of the lower sections 146 are provided with foot portions 150 for engagement with the upper side wall 82 of the tire casing 84 adjacent the bead portion of the upper side wall.

Figure 4:
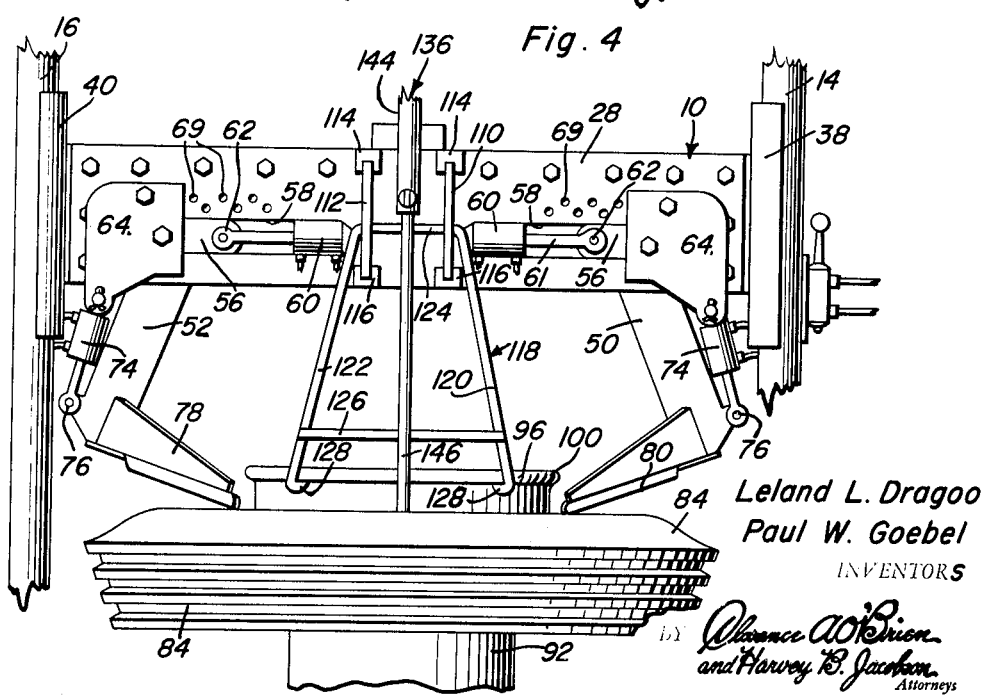
FIGURE 4 is a fragmentary side elevational view similar to FIGURE 1 but showing the operating parts of the tire changing machine in different positions and the side wall of the tire casing being held in a depressed position in readiness for the pressure head of the machine to be raised relative to the base so as to lift the wheel rim out of the center of the tire casing.

In operation, the rim 96 with the tire casing 84 mounted thereon is first disposed on the adapter ring 94 with the split ring retaining flange (not shown) disposed uppermost. Then, the fluid motor 42 may be actuated to lower the pressure head assembly 24 in order that the foot portions defined by the arms 78 and 80 may engage the uppermost side wall of the tire casing 84 and deflect that side wall downwardly. Then, while the arms 78 and 80 of each of the leg members 50 and 52 maintain the uppermost side wall of the casing 84 in a depressed condition, the removable split retaining flange or locking ring (not shown) may be manually removed. Then, the pressure head 24 may be raised and the fluid motor 102 may be actuated to shift the upstanding support 92 to the position illustrated in phantom lines in FIGURE 2 of the drawings. Then, the wheel rim 96 is turned upside down and again placed on the adapter ring 94. Thereafter, the hydraulic or fluid motor 102 is again actuated to return the upstanding support member 92 to the position illustrated in solid lines in FIGURE 2 of the drawings. Then, the pressure head 24 may again be lowered so as to urge the then uppermost side wall 82 of the tire casing 84 downwardly as shown in FIGURE 4 of the drawings. Thereafter, the lift arms 118 may be engaged with the permanent integral flange 100 of the rim 96 and the leg elements 136 and 138 engaged with the upper side wall 82 and fully extended so as to maintain the upper side wall 82 in the downwardly displaced position illustrated in FIGURE 5 of the drawings. Then, the hydraulic or fluid motor 84 may be again actuated to raise the crosshead 24 whereby the lift arms 118 will lift the rim 96 out of the tire casing 84 and upwardly away from the fitting 94.

When it is desired to again mount the tire casing 84 on the rim 96, the rim 96 is first positioned on the fitting 94 with the integral flange 100 disposed lowermost. Then the tire casing 84 is placed over the upper end of the rim 96 and urged downwardly by lowering the pressure head 24 with the arm members 78 and 80 engaged with the then upper side wall of the tire casing 84. After the tire casing 84 has had its upper side wall depressed, the removable lock ring may be lockingly engaged with the rim 96. Thereafter, the pressure head 24 may be raised and the rim 96 may be removed from the fitting 94 in order that the tire casing 84 may be inflated.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A tire changing machine adapted to assist in the removal of a tire casing from and its mounting on a wheel rim of the type including a split lock ring, said machine comprising a base, upstanding support means on said base defining an upstanding center axis and including means adapted to support a wheel rim in an elevated horizontally disposed position above said base, a pressure head, means mounting said pressure head from said base above said support means for guided movement toward and away from said support means, motor means operatively connected between said base and said pressure head for raising and lowering the latter, depending pressure leg members carried by said pressure head and including foot portions adapted to engage the upper side wall of a tire casing disposed on a wheel rim supported from said support means at points spaced circumferentially about said side wall for urging the latter downwardly relative to said rim upon the lowering of said pressure head relative to said support means, a plurality of depending elongated longitudinally extendable leg elements supported from said base above said upstanding support means and including lower end portions adapted to engage said upper side wall after the latter has been depressed by said leg members and to maintain said side wall in a depressed condition as said pressure head is raised relative to said base, said leg elements and said base including coacting means pivotally securing the upper ends of said leg elements to said base for rotation about horizontal axes disposed at generally right angles to said center axis, said pressure head also including depending lift arms including lower end portions adapted to releasably engage and lift said rim as said pressure head is raised while said leg elements hold said side wall in said depressed condition.

2. A tire changing machine adapted to assist in the removal of a tire casing from and its mounting on a wheel rim of the type including a split lock ring, said machine comprising a base, upstanding support means on said base defining an upstanding center axis and including means adapted to support a wheel rim in an elevated horizontally disposed position above said base, a pressure head, means mounting said pressure head from said base above said support means for guided movement toward and away from said support means, motor means operatively connected between said base and said pressure head for raising and lowering the latter, depending pressure leg members carried by said pressure head and including foot portions adapted to engage the upper side wall of a tire casing disposed on a wheel rim supported from said support means at points spaced circumferentially about said side wall for urging the latter downwardly relative to said rim upon the lowering of said pressure head relative to said support means, a plurality of depending elongated longitudinally extendable leg elements supported from said base above said upstanding support means and including lower end portions adapted to engage said upper side wall after the latter has been depressed by said leg members and to maintain said side wall in a depressed condition as said pressure head is raised relative to said base.

3. The combination of claim 2 including means mounting said upstanding support means on said base for reciprocal movement laterally of said center axis along a predetermined path extending laterally of said center axis.

4. A tire changing machine adapted to assist in the removal of a tire casing from and its mounting on a wheel rim of the type including a split lock ring, said machine comprising a base, upstanding support means on said base defining an upstanding center axis and including means adapted to support a wheel rim in an elevated horizontally disposed position above said base, a pressure head, means mounting said pressure head from said base above said support means for guided movement toward and away from said support means, motor means operatively connected between said base and said pressure head for raising and lowering the latter, depending pressure leg members carried by said pressure head and including foot portions adapted to engage the upper side wall of a tire casing disposed on a wheel rim supported from said support means at points spaced circumferentially about said side wall for urging the latter downwardly relative to said rim upon the lowering of said pressure head relative to said support means, a plurality of depending elongated longitudinally extendable leg elements supported from said base above said upstanding support means and including lower end portions adapted to engage said upper side wall after the latter has been depressed by said leg members and to maintain said side wall in a depressed condition as said pressure head is raised relative to said base, said pressure head also including lift arms including lower end portions adapted to releasably engage and lift said rim as said pressure head is raised while said leg elements hold said side wall in said depressed condition.

5. The combination of claim 4 wherein said lift arms and pressure head including coacting means pivotally securing the upper ends of said lift arms to said pressure head for rotation about horizontal axes disposed at generally right angles to said center axis.

6. The combination of claim 5 wherein said last-mentioned coacting means include means for vertically adjusting the axis of rotation of said lift arms relative to said pressure head.

7. A tire changing machine adapted to assist in the removal of a tire casing from and its mounting on a wheel rim of the type including a split lock ring, said machine comprising a base, upstanding support means on said base defining an upstanding center axis and including means adapted to support a wheel rim in an elevated horizontally disposed position above said base, a pressure head, means mounting said pressure head from said base above said support means for guided movement toward and away from said support means, motor means operatively connected between said base and said pressure head for raising and lowering the latter, depending pressure leg members carried by said pressure head and including foot portions adapted to engage the upper side wall of a tire casing disposed on a wheel rim supported from said support means at points spaced circumferentially about said side wall for urging the latter downwardly relative to said rim upon the lowering of said pressure head relative to said support means, a plurality of depending elongated longitudinally extendable leg elements supported from said base above said upstanding support means and including lower end portions adapted to engage said upper side wall after the latter has been depressed by said leg members and to maintain said side wall in a depressed condition as said pressure head is raised relative to said base, said extendable leg elements and said base including coacting means pivotally securing the upper ends of said leg elements to said base for rotation about horizontal axes disposed at generally right angles to said center axis.

8. The combination of claim 7 including means operatively connected between said leg members and said pressure head for swinging said leg members relative to said base.

9. The combination of claim 8 including means operatively connected between said pressure head and said leg members for effecting lateral adjustment of the axes of rotation of said leg members toward and away from said center axis.

References Cited by the Examiner
UNITED STATES PATENTS

| | | | |
|---|---|---|---|
| 2,436,003 | 2/1948 | Gosselin | 157—1.2 |
| 2,537,041 | 1/1951 | Finch | 157—1.2 |
| 2,551,994 | 5/1951 | Bloodworth et al. | 157—1.2 |
| 2,618,320 | 11/1952 | Deysher et al. | 157—1.2 |
| 2,972,375 | 2/1961 | Hunt | 157—1.2 |
| 3,082,812 | 3/1963 | Bickett | 157—1.2 |

WHITMORE A. WILTZ, *Primary Examiner.*